United States Patent
Kratzer et al.

(10) Patent No.: US 7,520,954 B2
(45) Date of Patent: Apr. 21, 2009

(54) METHOD AND APPARATUS FOR SEPARATING DISC-SHAPED SUBSTRATES

(75) Inventors: Martin Kratzer, Feldkirch (AT); Bernd Heinz, Buchs (CH)

(73) Assignee: Singulus Technologies AG, Kahl am Main (DE)

(*) Notice: Subject to any disclaimer, the term of this patent is extended or adjusted under 35 U.S.C. 154(b) by 289 days.

(21) Appl. No.: 11/085,430

(22) Filed: Mar. 21, 2005

(65) Prior Publication Data
US 2005/0205205 A1 Sep. 22, 2005

Related U.S. Application Data

(60) Provisional application No. 60/555,106, filed on Mar. 22, 2004.

(51) Int. Cl.
*B32B 38/10* (2006.01)
(52) U.S. Cl. .............. 156/344; 156/584; 29/239; 29/426.4; 29/426.5
(58) Field of Classification Search .............. 156/344, 156/584; 29/239, 426.1, 426.4, 426.5, 426.6
See application file for complete search history.

(56) References Cited

U.S. PATENT DOCUMENTS

| 5,575,868 A | * | 11/1996 | Mann ..................... 156/64 |
| 6,478,069 B1 | | 11/2002 | Fujisaku |
| 6,821,376 B1 | * | 11/2004 | Rayssac et al. ......... 156/344 |
| 2003/0051822 A1 | * | 3/2003 | Fujisaku et al. ........ 156/584 |
| 2003/0116274 A1 | | 6/2003 | Kitano |

FOREIGN PATENT DOCUMENTS

JP 62230537 A * 10/1987

* cited by examiner

*Primary Examiner*—Mark A Osele
(74) *Attorney, Agent, or Firm*—Pearne & Gordon LLP

(57) ABSTRACT

A method for separating bonded substrates and a respective apparatus used for that method is disclosed. The method comprises positioning the bonded substrates (1) in an evacuable chamber (2) by respective means, detaching a space (10) from that evacuable chamber by means of a sealing arrangement (4) so that said space comprises a partial area of the substrates with at least one gap (5) between the bonded substrates (1), lowering the pressure in the vacuum chamber (2) while maintaining the pressure in the space (10), thereby causing the bonded substrates to separate.

6 Claims, 1 Drawing Sheet

METHOD AND APPARATUS FOR SEPARATING DISC-SHAPED SUBSTRATES

FIELD OF THE INVENTION

The present invention relates to a method and apparatus for separating two disc-shaped substrates which have been bonded together. This technique can be used in optical disc production, e.g. DVD-14/18, DVD+R9 and other multilayer media.

BACKGROUND OF THE INVENTION

The common way to produce a dual layer single side DVD (like DVD-9) is, to bond two 0.6 mm substrates together each carrying an information layer. Another way to make a double layer disk is to use the so called 2P-process. Instead of forming one layer on each substrate, the 2P process gives rise to a single substrate structure with two internal information layers. This is not necessary for DVD-9 production, but for other multilayer formats like DVD14/18 or DVDR9.

In the first step of the 2P process a first substrate with an information layer is produced by injection moulding and coated with layer material which is appropriate for the format. Then a second substrate is produced with a second information layer—this second substrate is bonded together with the first substrate using typically an UV-curing adhesive. In the next step the 2 substrates are separated whereby the UV resin with the image of the information layer of the second substrate must remain completely at the first substrate. Depending on the application it is also possible to transfer a metallic layer in a similar way from the second to the first substrate.

For a good stamping result and an easy separation the material choice of the second substrate is important. Whereas polycarbonate is typically used for the first substrate, PMMA or other nonpolar materials are used for the second substrate.

One critical step in the process is the separation of the 2 substrates. The problem regarding the separation of the 2 substrates is that the disk shaped bonded DVD provides no suitable point for mechanical separation. Any damage on first substrate (carrying the information layer) has to be avoided. Therefore mechanical force, like mechanical gripper, can be used only with high cautiousness. A second problem to mention is that pulverized adhesive, created during the separation process can lower the quality of the media and thereby decreasing the output of the production.

RELATED ART

US 2003/0116274 describes a technique, whereby a gas is blown from the center hole of a laminated disc between the upper and lower substrate portions to separate both of said disc-shaped substrates. Depending on the adhesion strength a considerable pressure is necessary.

U.S. Pat. No. 6,478,069 further proposes the use of a wedge as an external force applying device, which facilitates and or initiates the peeling of the substrate portions by generating a gip. Compressed air supplied into this gap leads to a complete separation of the substrates.

SUMMARY OF THE INVENTION

Figure 1:
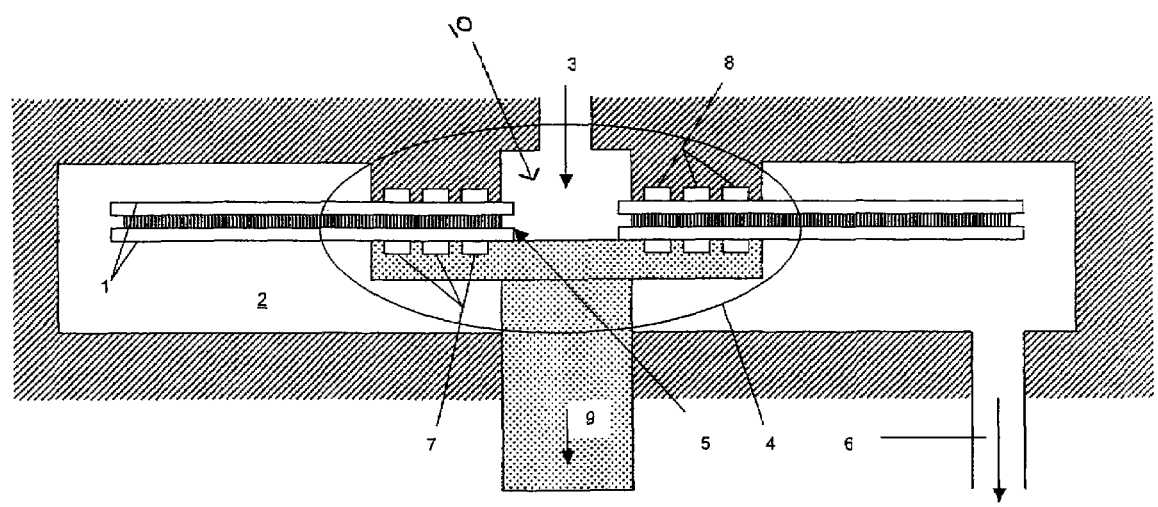
FIG. 1 shows an apparatus for separating bonded substrates as hereinafter described.

To separate the substrates according to this invention, the bonded substrates 1 are brought into a vacuum chamber 2. At least from one side of the disk the space 10 around the centre hole should have an open connection (inlet) 3 to e.g. the ambient air, to maintain a pressure of around one bar in-between the disk. The sealing 4 to allow a creation of vacuum in the chamber is placed directly around (more generally in the vicinity of) the centerhole of the disk, at least for one of the substrates, thereby separating the space 10 from the vacuum chamber 2. When creating a vacuum in the chamber, a peeling force occurs, trying to separate the disks starting from the very inner gap 5 in-between the two substrates which is not glued together to a certain minimum radius. In a static arrangement the separation is prevented when the substrates are pressed together in the centre. But as soon as there is a movement of the at least one of the sealing arrangements, the disks are becoming separated.

The typical vacuum range for separation is below 0.5 mbar, preferably better than 0.3 mbar, giving more the >50% (>70%) of the maximal possible separating force. Due to the fact that the evacuated room around the disk can be rather small the pumping time to achieve the required vacuum can be less then is. Pumping means (not shown) are connected to exhaust 6.

In a further embodiment the sealing part can be a vacuum chuck with channels 7, 8, supporting the separation tendency. The movement 9 can be achieved be an active part, similar to a piston or the movement can be achieved by using elastic sealing materials.

In another embodiment of the invention a mechanical means is employed to initiate and/or support the separation process. Said device may comprise a wedge, a pin, a lever or a spike, acting upon the gap (5) between the substrates (1).

If particles and/or fine dust powder is produced by the separation due to brittle UV-resin parts, they are easily removed by the air flow generated due to the vacuum.

In other words a method for separating bonded substrates, such as disc shaped substrates with a center hole, may comprise the steps of positioning the bonded substrates in an evacuable chamber, detaching a space from that evacuable chamber by means of a sealing arrangement, whereby said space comprises a partial area of the substrates with at least one gap between the bonded substrates. Lowering the pressure in the vacuum chamber while maintaining the pressure in the space (e.g. ambient atmospheric conditions), causes the bonded substrates to separate. In a preferred embodiment, wherein the sealing arrangement (4) is constructively connected with a vacuum chuck. This chuck may exert a mechanical force to the gap to support the separation of the substrates. In a preferred embodiment the space is arranged in the vicinity of the center hole of the disc. Mechanical means my facilitate the separation process at the beginning and/or during the separation process. An apparatus suitable for such process will therefore comprise an evacuable chamber, means for positioning the bonded substrates in the chamber, a sealing arrangement for detaching a space (10) from that evacuable chamber, such that the substrate is partially located in the space and pumping means for lowering the pressure in the evacuable chamber. Accordingly the sealing arrangement may comprise a vacuum chuck, which can in a further embodiment comprise an active part to support the separation.

The invention claimed is:

1. A method for separating bonded substrates comprising the steps:

positioning the bonded substrates (1) in an evacuable chamber (2), detaching a space (10) from that evacuable chamber by means of a sealing arrangement (4), said space comprising a partial area of the substrates with at least one gap (5) between the bonded substrates (1), said sealing arrangement (4) being constructively connected with a vacuum chuck that is sealed, and separating said substrates via a method consisting essentially of the following steps:
(a) lowering the pressure in the vacuum chamber (2) while maintaining the pressure in the space (10), thereby causing the bonded substrates to separate, and
(b) operating the vacuum chuck to exert a mechanical pulling force on the respective substrates via the movement (9) of a piston to support the separation of the substrates (1).

2. Method according to claim 1, wherein the space (10) is exposed to ambient air.

3. Method according to claim 1, wherein the bonded substrates are disc shaped and form part of a disc with a center hole.

4. Method according to claim 3, wherein the space (10) is arranged in the vicinity of the center hole of the disc.

5. A method according to claim 1, wherein lowering the pressure means reducing the pressure at least to 0.5 mbar.

6. A method according to claim 5, said pressure being reduced to less than 0.3 mbar.

\* \* \* \* \*

UNITED STATES PATENT AND TRADEMARK OFFICE
CERTIFICATE OF CORRECTION

PATENT NO. : 7,520,954 B2 Page 1 of 1
APPLICATION NO. : 11/085430
DATED : April 21, 2009
INVENTOR(S) : Martin Kratzer et al.

It is certified that error appears in the above-identified patent and that said Letters Patent is hereby corrected as shown below:

In the Specification, column 2, line 21, please replace "is" with -- 1s --.

Signed and Sealed this

Eleventh Day of August, 2009

David J. Kappos
*Director of the United States Patent and Trademark Office*